United States Patent
Schmidt et al.

(10) Patent No.: US 9,522,738 B2
(45) Date of Patent: Dec. 20, 2016

(54) SOFT COVER RELEASE MECHANISM FOR EVACUATION SLIDES

(71) Applicant: Goodrich Corporation, Charlotte, NC (US)

(72) Inventors: Ryan Schmidt, Gilbert, AZ (US); Helperus Ritzema Rautenbach, Tempe, AZ (US)

(73) Assignee: Goodrich Corporation, Charlotte, NC (US)

( * ) Notice: Subject to any disclaimer, the term of this patent is extended or adjusted under 35 U.S.C. 154(b) by 112 days.

(21) Appl. No.: 14/694,769

(22) Filed: Apr. 23, 2015

(65) Prior Publication Data
US 2016/0311543 A1    Oct. 27, 2016

(51) Int. Cl.
B64C 1/22    (2006.01)
B64D 25/14    (2006.01)

(52) U.S. Cl.
CPC .................................... B64D 25/14 (2013.01)

(58) Field of Classification Search
USPC ................................... 244/137.2, 137.1, 905
See application file for complete search history.

(56) References Cited

U.S. PATENT DOCUMENTS

| | | | |
|---|---|---|---|
| 2,959,278 A * | 11/1960 | Mitchell | B63C 9/22 206/803 |
| 3,463,266 A * | 8/1969 | Day | B64D 25/14 182/48 |
| 4,104,964 A * | 8/1978 | Larkworthy | B65B 67/00 100/232 |
| 4,441,582 A * | 4/1984 | Ward, Jr. | B64D 25/14 182/48 |
| 4,519,782 A * | 5/1985 | Fisher | A62B 1/20 182/48 |
| 4,567,977 A | 2/1986 | Fisher | |
| 5,360,186 A * | 11/1994 | Danielson | B64D 25/14 193/25 B |
| 5,906,340 A * | 5/1999 | Duggal | B64D 25/14 182/48 |
| 5,975,467 A * | 11/1999 | O'Donnell | B64D 25/14 182/48 |
| 6,641,445 B1 | 11/2003 | Jurlina et al. | |
| 6,644,596 B1 | 11/2003 | Jurlina et al. | |
| 6,814,183 B2 * | 11/2004 | Horvath | B64D 25/14 182/48 |
| 6,959,658 B2 * | 11/2005 | Gronlund | B64D 25/14 112/475.01 |
| 7,467,764 B2 * | 12/2008 | Hintzman | B64D 25/14 182/48 |
| 8,952,828 B2 * | 2/2015 | Kohlmeier-Beckmann | A62B 3/00 340/425.5 |

* cited by examiner

*Primary Examiner* — Christopher P Ellis
(74) *Attorney, Agent, or Firm* — Snell & Wilmer L.L.P.

(57) ABSTRACT

An emergency evacuation assembly may comprise an inflatable slide, a soft cover containing the inflatable slide, a lace holding the soft cover closed, a pin retaining the lace, and a pneumatic actuator configured to release the lace by pulling the pin. In various embodiments, the pneumatic actuator may include a housing, a cylinder disposed within the housing, a plunger disposed within the cylinder, a seal disposed within the cylinder, and a spring disposed within the housing.

8 Claims, 7 Drawing Sheets

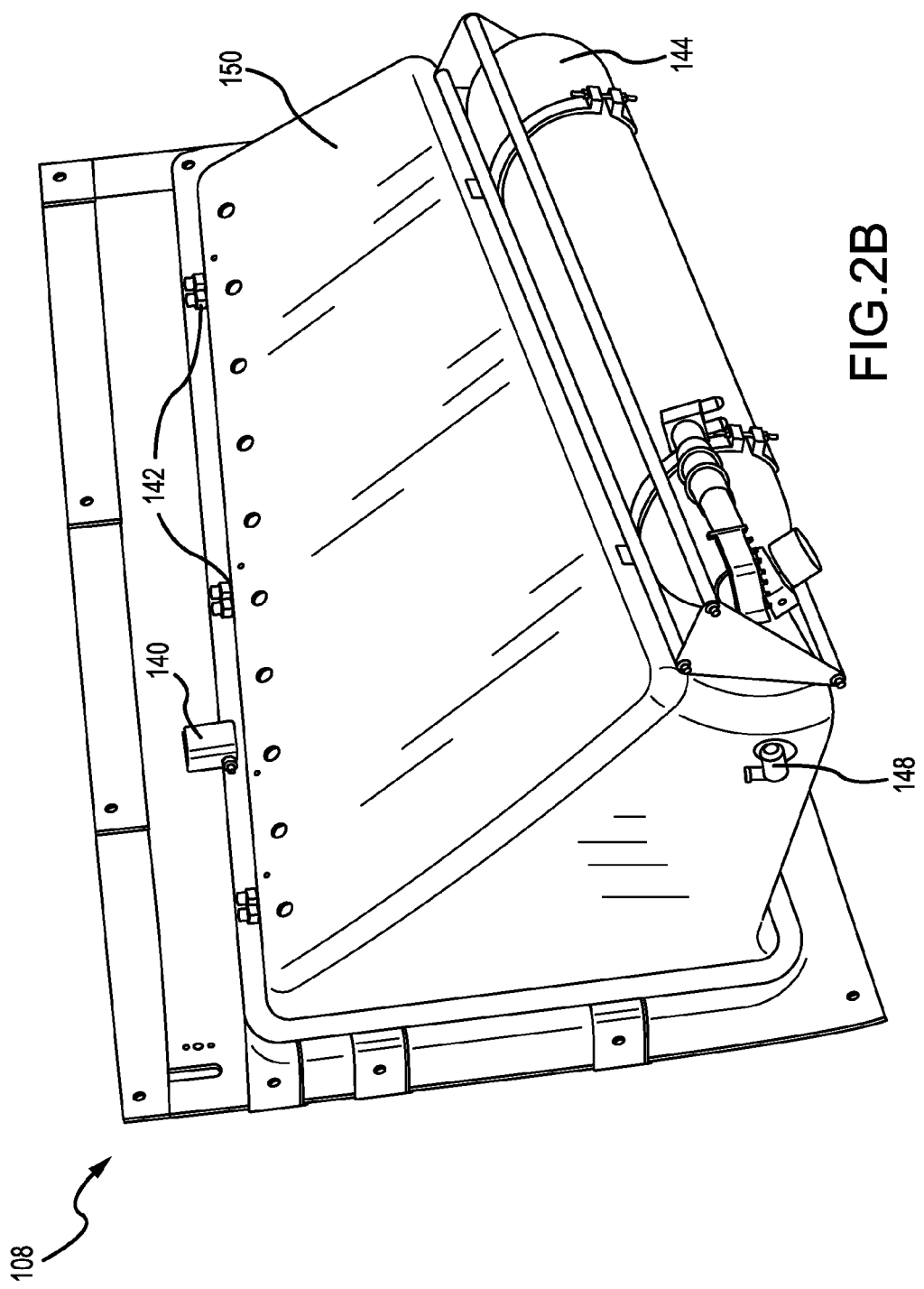

SOFT COVER RELEASE MECHANISM FOR EVACUATION SLIDES

FIELD OF INVENTION

The present disclosure relates to aircraft evacuation slides, and, more specifically, to a release actuator for an evacuation slide.

BACKGROUND

A fabric soft cover may be used to hold a fuselage-mounted evacuation slide in its container (i.e., packboard). The soft cover may have two fabric panels attached to the container to form a lid. The fabric panels may be laced together using speed lacing. The fabric panels may be designed to open to deploy the evacuation slide. Typically, the lacing is cut or opened to deploy the slide. Solutions for unlacing the panels by using initial inflatable/aspirator motion to remove a pin may be sensitive to inconsistencies in lacing or otherwise be unreliable. Solutions making the pin frangible so that it snaps to allow deployment may cause damage to the slide. Electrical solutions may cut the lace using an electrical signal, but in some aircraft an electric signal may not be available to trigger the cutting device.

SUMMARY

An emergency evacuation assembly may comprise an inflatable slide, a soft cover containing the inflatable slide, a lace holding the soft cover closed, a pin retaining the lace, and a pneumatic actuator configured to release the lace by pulling the pin.

In various embodiments, the lace may comprise a daisy chain configuration. A charged tank may be fluidly coupled to the pneumatic actuator and the inflatable slide. A ball lock may also be fluidly coupled to the charged tank. A panel may be configured to be released by the ball lock. A manual valve may be fluidly coupled between the charged tank and the pneumatic actuator.

In various embodiments, the pneumatic actuator may include a housing, a cylinder disposed within the housing, a plunger disposed within the cylinder, a seal disposed within the cylinder, and a spring disposed within the housing. The spring may be configured to apply a force to the plunger. An arm of the pneumatic actuator may be coupled to the plunger and the pin. An inlet may be fluidly coupled to the cylinder between the plunger and the seal. The spring and the seal may be disposed on opposite sides of the plunger.

A pneumatic actuator may comprise a housing, a cylinder disposed within the housing, a plunger disposed within the cylinder, a seal disposed within the cylinder, and a spring disposed within the housing and configured to apply a force to the plunger.

In various embodiments, an arm may be coupled to the plunger. An interface may be disposed on the arm. An inlet may be fluidly coupled to the cylinder between the plunger and the seal. The spring and the seal may be disposed on opposite sides of the plunger.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 2B illustrates an emergency evacuation assembly with a charged tank and pneumatic actuator, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Emergency evacuation slides may be released from packing using various techniques. Emergency slides may be inflated using a charged pneumatic system. In various embodiments, the pneumatic system that inflates the slide may be used to release the slide from its soft cover. Thus, the emergency evacuation slide assembly may be operated without an electrical signal to release the slide.

Figure 1:
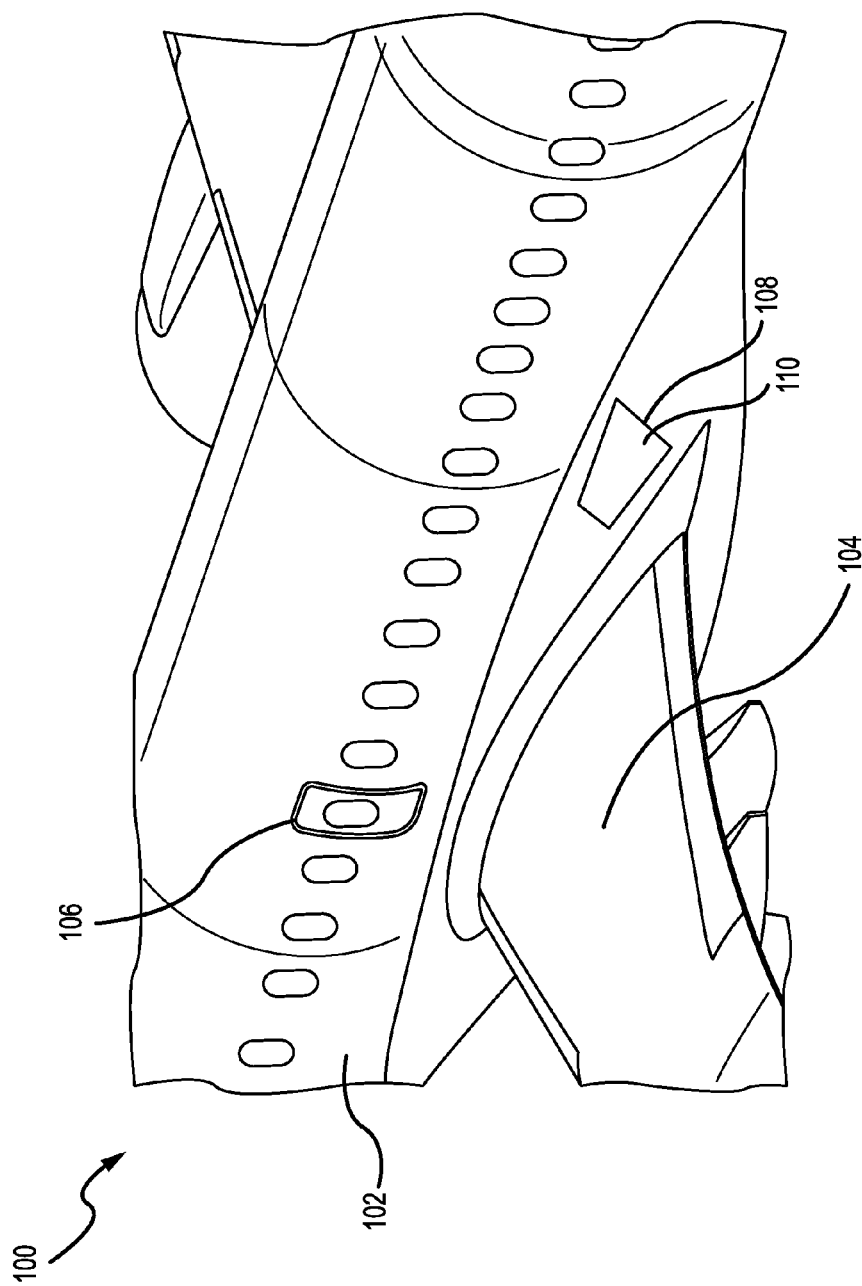
FIG. 1 illustrates an exemplary aircraft evacuation system, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Panel 110 may cover evacuation slide assembly 108 when installed on aircraft 100. Evacuation slide assembly 108 may jettison panel 110 and deploy an inflatable slide in response to emergency exit door 106 opening.

Figure 2A:
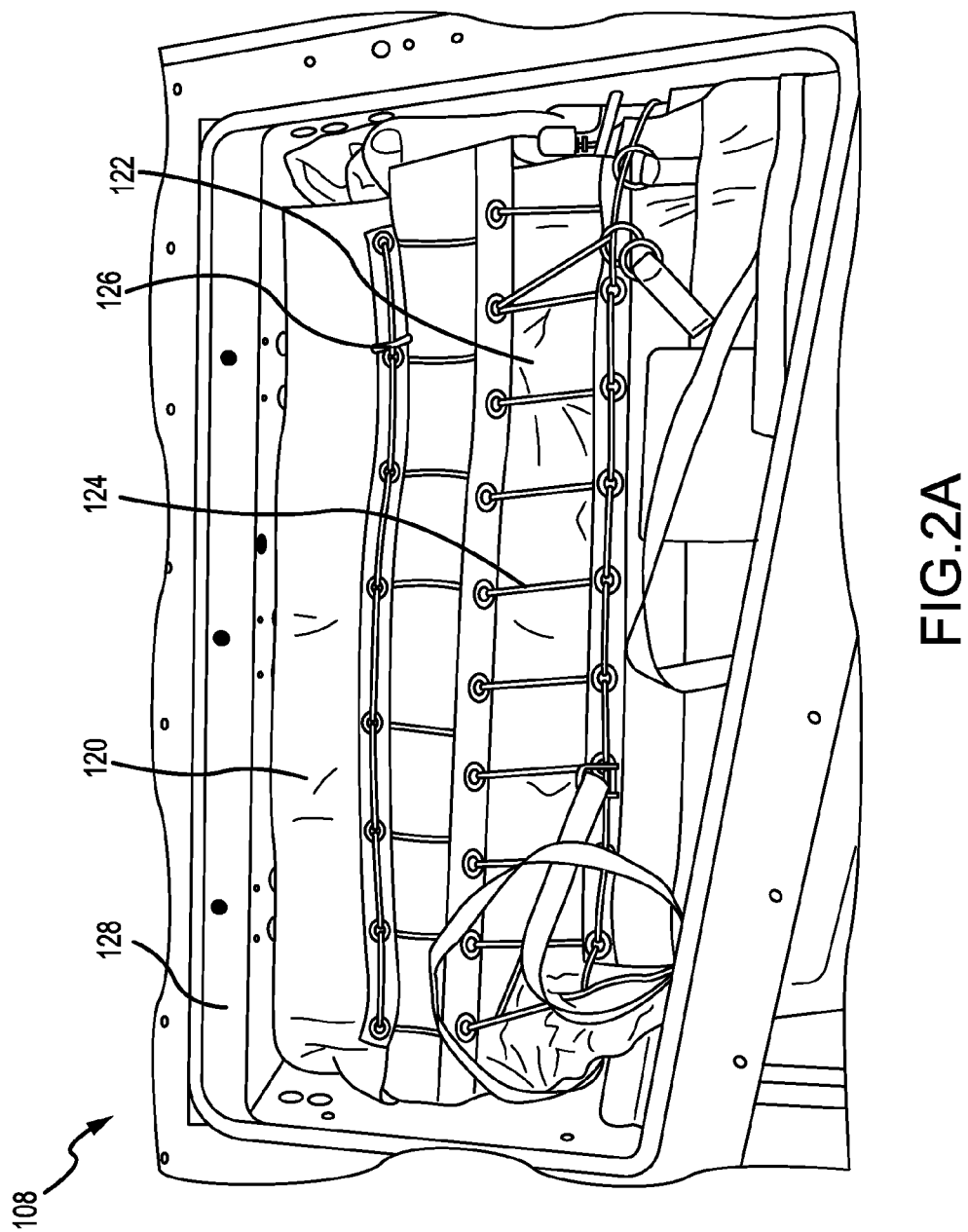
FIG. 2A illustrates an emergency evacuation assembly including a slide in a fabric pack with a laced enclosure and release pin, in accordance with various embodiments.

With reference to FIG. 2A, evacuation slide assembly 108 is shown as viewed from an outboard side with panel 110 (of FIG. 1) removed from panel interface 128, in accordance with various embodiments. Evacuation slide assembly 108 may comprise soft cover 120 containing slide 122. Soft cover 120 may have lace 124 to enclose soft cover 120 and retain slide 122. Lace 124 may be in a daisy chain or speed lacing configuration with pin 126 closing the daisy chain or speed lacing. Pin 126 may be slideably coupled to lace 124 such that lace 124 may unlace in response to movement of pin 126. In that regard, pin 126 may prevent lace 124 from unfurling and releasing slide 122 while pin is in place. A pneumatic actuator (described in detail below) may be positioned to pull pin 126 and release slide 122 from soft cover 120. Pin 126 may be disposed in a retaining structure and the translated away from the retaining structure to release lace 124.

With reference to FIG. 2B, evacuation slide assembly 108 is shown as viewed from an inboard direction, in accordance with various embodiments. Evacuation slide assembly 108 may include housing 150 (also referred to as a packboard) with actuator 140 coupled to housing 150. Ball locks 142 may be coupled to housing 150 as well and configured to release panel 110 (of FIG. 1). Charged tank 144 may be mounted to the back of housing 150. Charged tank 144 may provide pressurized gas to inflate slide 122 (of FIG. 2A), to motivate actuator 140, and to release ball locks 142. Charged tank may be pneumatically coupled to components of evacuation slide assembly 108 through inlet 148.

Figure 3:
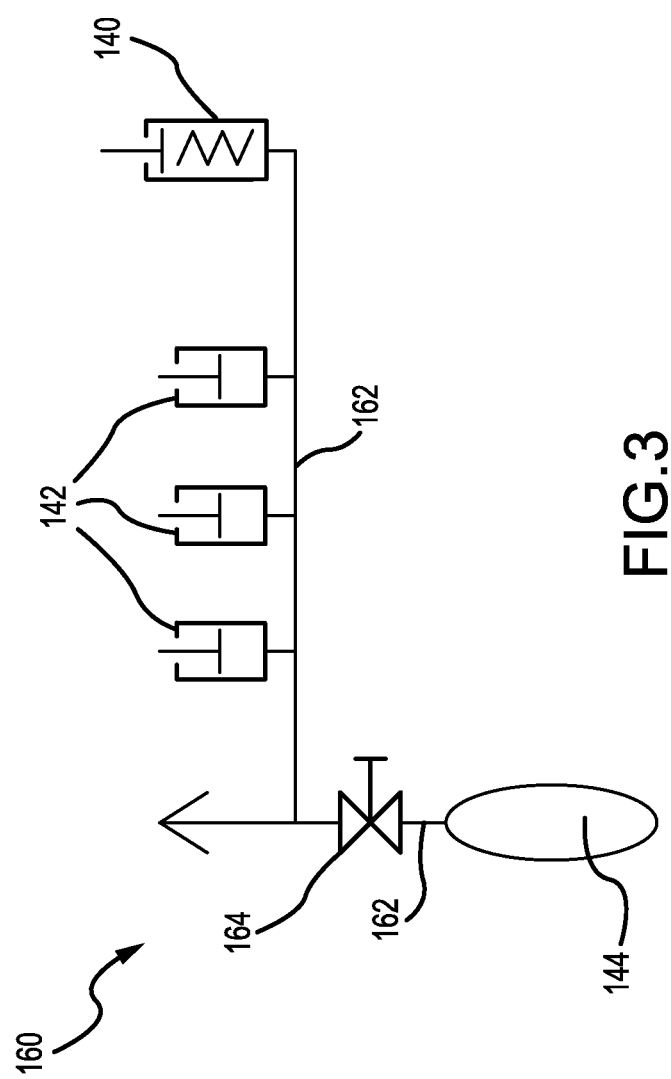
FIG. 3 illustrates a schematic diagram of a pneumatic system for an emergency evacuation assembly, in accordance with various embodiments.

With reference to FIG. 3, a schematic diagram of pneumatic system 160 pneumatically powered by charged tank 144 is shown, in accordance with various embodiments. Charged tank 144 may be coupled to components of pneumatic system 160 by conduits 162. Conduits 162 may be gas lines to translate pressurized gas to pneumatic components of pneumatic system 160. Manually actuated valve 164 may be coupled to charged tank 144 to provide a manual control for pneumatic system 160. Ball locks 142 may be pneumatic ball locks fluidly coupled to charged tank 144 by conduit 162. Actuator 140 may be fluidly coupled to charged tank 144 by conduit 162. Actuator 140 may thus be motivated using pneumatic pressure from charged tank 144 without an electricity source or other power source to actuator 140.

Figure 4A:
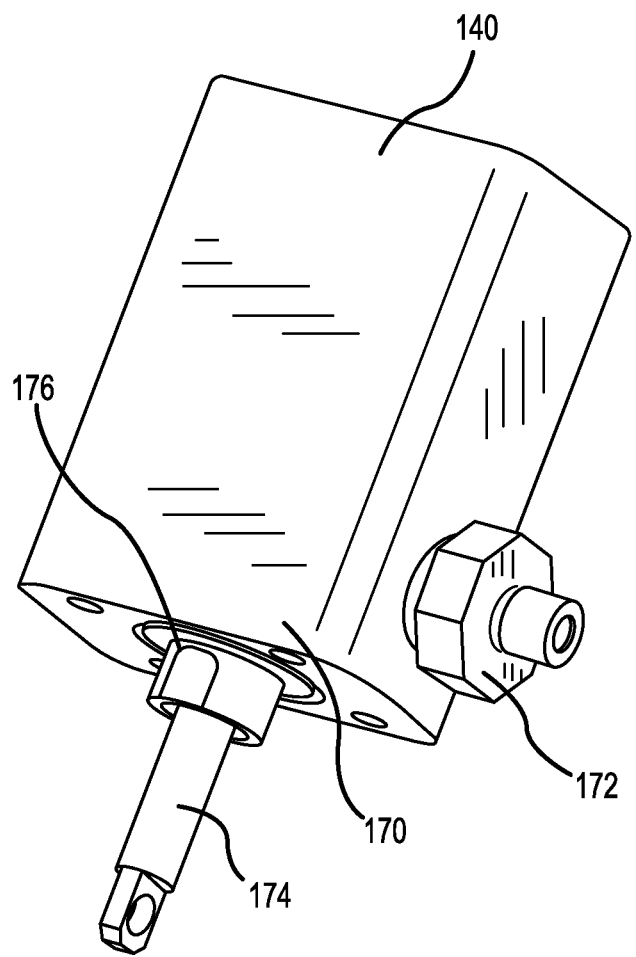
FIG. 4A illustrates a pneumatically actuated switch with a rod in an extended position, in accordance with various embodiments.
Figure 4B:
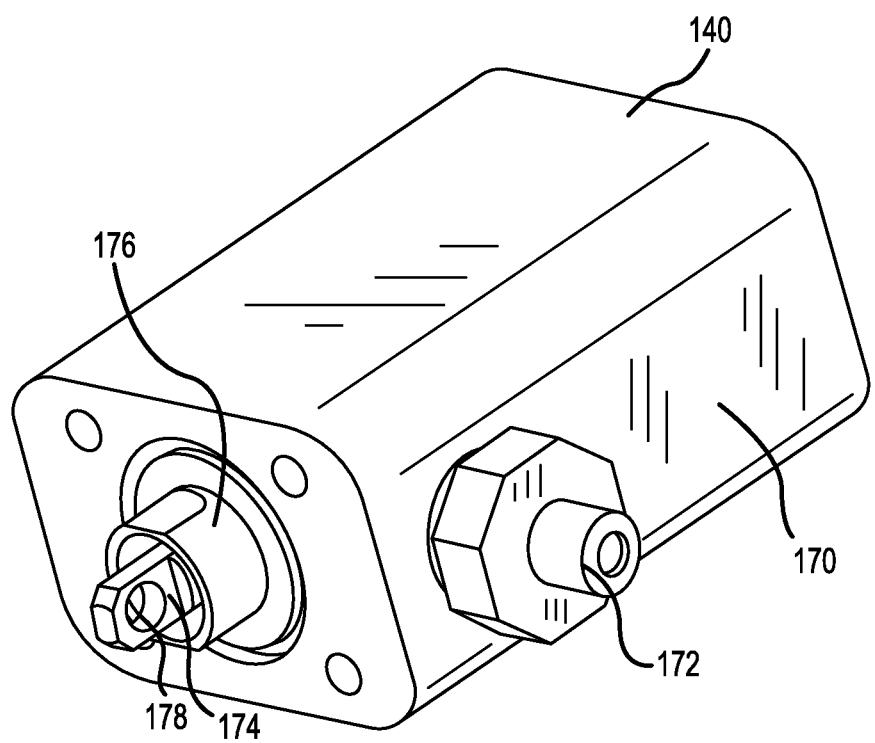
FIG. 4B illustrates a pneumatically actuated switch with a rod in an retracted position, in accordance with various embodiments.

With reference to FIGS. 4A and 4B, actuator 140 is shown with arm 174 in an extended and retracted position, respectively. In various embodiments, actuator 140 may have a housing 170. Housing 170 may be a rectangular, circular, or other shaped housing suitable to provide mechanical support. Housing 170 may have an inlet 172, which is fluidly coupled to charged tank 144 by conduit 162 of FIG. 3. A sleeve 176 may be an outlet for arm 174 such that arm 174 extends out of housing 170 through sleeve 176.

In various embodiments, arm 174 may be a cylindrical arm with interface 178 configured to couple to pin 126 (of FIG. 2A). Interface 178 may comprise a tab, a loop, an opening, a hook, or any suitable interface disposed on arm 174 and configured to urge pin 126 and release lace 124 (of FIG. 2A). Arm 174 of actuator 140 may be in an extended position when a minimum pneumatic pressure is not applied at inlet 172. Arm 174 of actuator 140 may retract into housing 170 through sleeve 176 in response to a minimum pneumatic pressure applied at inlet 172.

Figure 5:
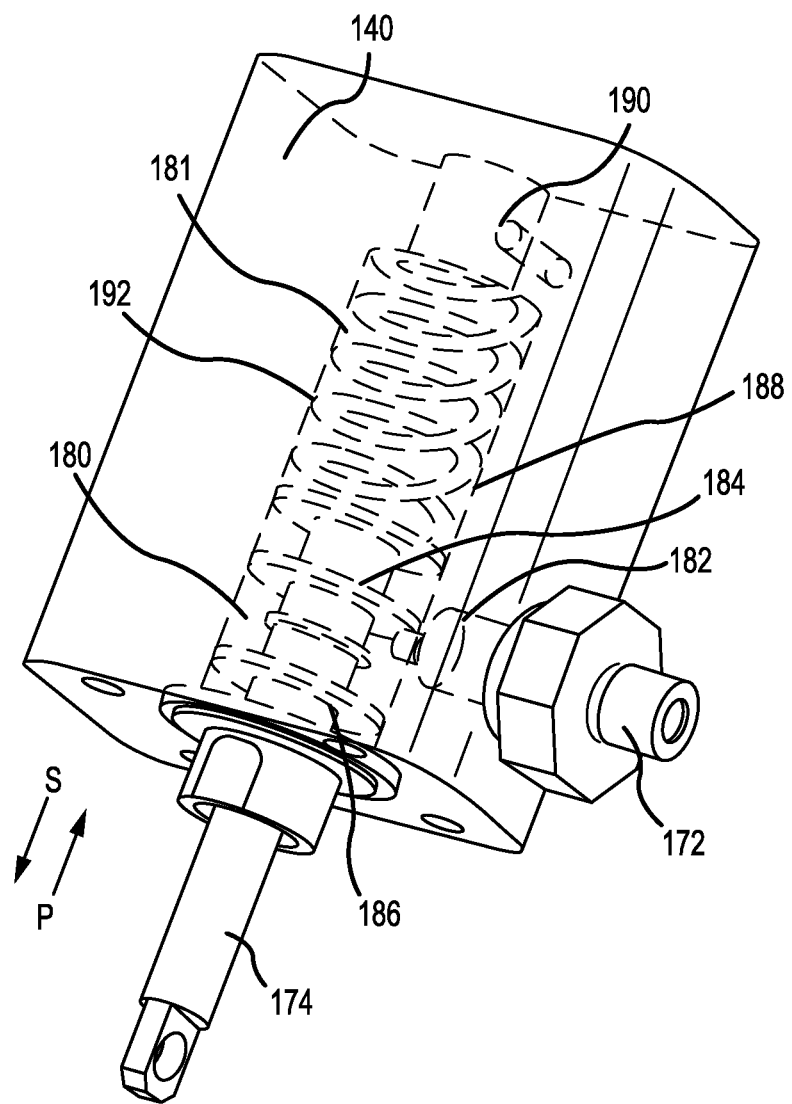
FIG. 5 illustrates a gas chamber and spring actuation system for a pneumatically actuated switch, in accordance with various embodiments.

With reference to FIG. 5, actuator 140 is shown with spring 192 applying force tending to extend (translate) arm 174 out of actuator 140, in accordance with various embodiments. Actuator 140 may have a cylinder 188. Plunger 184 may be coupled to arm 174 to translate motive force into arm 174. In that regard, plunger 184 and arm 174 may form a piston that moves relative to housing 170 and cylinder 188. Cylinder 188 may house a spring 192 configured to apply force to plunger 184 and maintain arm 174 in an extended or deployed position absent sufficient pneumatic pressure to overcome spring 192. In that regard, spring 192 may exert an expansive force in direction S. Both seal 186 and plunger 184 may provide sealing in cylinder 188 to seal gas in the volume 180 between plunger 184 and seal 186. Spring 192 and seal 186 may be disposed within cylinder 188 and on opposite sides of plunger 184 so that air pressure in volume 180 opposes the expansive force exerted by spring 192. Pressure in volume 180 may exert an expansive force in direction P.

In various embodiments, gas may enter cylinder 188 through inlet 172 and pass through delivery structure 182. Gas entrant actuator 140 through inlet 172 may be introduced in a volume 180 of cylinder 188 between plunger 184 and seal 186. Pneumatic pressure may exert a compressive force against spring 192. The spring constant of spring 192 may be selected so that the deployment pressure generated by charged tank 144 (of FIG. 2B) is sufficient to overcome the force exerted by spring 192 and compress spring 192. Plunger 184 may move toward spring 192 and expand the volume 180 of cylinder 188 disposed between plunger 184 and seal 186.

In various embodiments, during actuation, pressure may be relieved from the spring-side of cylinder 188 through valve 190. Valve 190 may release gas from volume 181 of cylinder 188 so that volume 181 is maintained at an ambient air pressure as volume 180 is pressurized. When pressure in volume 180 is relieved, spring 192 may provide a motive force to actuate plunger 184 toward seal 186 and decrease volume 180 between seal 186 and plunger 184. Arm 174 may extend out housing 170 in response to force applied by spring 192 in response to pressure in volume 180 being relieved. Actuator 140 may thus be controlled and powered by pneumatic system 160 (of FIG. 3) without the use of external electrical signals or power sourced. In that regard, actuator 140 may pull pin 126 (of FIG. 2A) and release slide 122 (of FIG. 2A) from soft cover 120 (of FIG. 2A). Actuator 140 may provide means to release slide 122 in aircraft where an electrical signal may not be present in evacuation slide assembly 108.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emergency evacuation assembly, comprising:
    an inflatable slide;
    a soft cover containing the inflatable slide;
    a lace holding the soft cover closed;
    a pin retaining the lace; and
    a pneumatic actuator configured to release the lace by pulling the pin, said pneumatic actuator comprising: a housing; a cylinder disposed within the housing; a plunger disposed within the cylinder; a seal disposed within the cylinder; a spring disposed with the housing and configured to apply a force to the plunger; and an arm coupled to the plunger, wherein the pneumatic actuator is coupled to the pin.

2. The emergency evacuation assembly of claim 1, wherein the lace comprises a daisy chain configuration.

3. The emergency evacuation assembly of claim 1, further comprising a charged tank fluidly coupled to the pneumatic actuator and the inflatable slide.

4. The emergency evacuation assembly of claim 3, further comprising a ball lock fluidly coupled to the charged tank.

5. The emergency evacuation assembly of claim 4, further comprising a panel configured to be released by the ball lock.

6. The emergency evacuation assembly of claim 3, further comprising a manual valve fluidly coupled between the charged tank and the pneumatic actuator.

7. The emergency evacuation assembly of claim 1, further comprising an inlet fluidly coupled to the cylinder between the plunger and the seal.

8. The emergency evacuation assembly of claim 7, wherein the spring and the seal are disposed on opposite sides of the plunger.

\* \* \* \* \*